(12) United States Patent
Myers (10) Patent No.: US 12,306,701 B2
(45) Date of Patent: May 20, 2025

(54) DATA STREAM WATCHDOG INJECTION

(71) Applicant: Allegro MicroSystems, LLC, Manchester, NH (US)

(72) Inventor: Charles Myers, Portland, OR (US)

(73) Assignee: Allegro MicroSystems, LLC, Manchester, NH (US)

( * ) Notice: Subject to any disclaimer, the term of this patent is extended or adjusted under 35 U.S.C. 154(b) by 722 days.

(21) Appl. No.: 17/657,140

(22) Filed: Mar. 30, 2022

(65) Prior Publication Data

US 2023/0315555 A1 Oct. 5, 2023

(51) Int. Cl.
G06F 11/07 (2006.01)

(52) U.S. Cl.
CPC ...... *G06F 11/0757* (2013.01); *G06F 11/0739* (2013.01); *G06F 11/0796* (2013.01)

(58) Field of Classification Search
CPC ............ G06F 11/0736; G06F 11/0739; G06F 11/0754; G06F 11/0757; G06F 11/0796; G06F 11/3013; G05B 19/0425; G05B 19/0428; G05B 19/048; G05B 23/0218; G05B 23/0256

See application file for complete search history.

(56) References Cited

U.S. PATENT DOCUMENTS

| | | | |
|---|---|---|---|
| 5,917,320 A | 6/1999 | Scheller et al. | |
| 6,091,239 A | 7/2000 | Vig et al. | |
| 6,297,627 B1 | 10/2001 | Towne et al. | |
| 6,351,829 B1 * | 2/2002 | Dupont | G06F 11/0736 714/48 |
| 6,693,419 B2 | 2/2004 | Stauth et al. | |
| 6,760,145 B1 | 7/2004 | Taylor et al. | |
| 6,778,728 B2 | 8/2004 | Taylor et al. | |

(Continued)

FOREIGN PATENT DOCUMENTS

TW 201422772 6/2014

OTHER PUBLICATIONS

U.S. Final Office Action dated Oct. 20, 2023 for U.S. Appl. No. 17/400,300; 8 Pages.

(Continued)

*Primary Examiner* — Gabriel Chu
(74) *Attorney, Agent, or Firm* — DALY, CROWLEY, MOFFORD & DURKEE, LLP (57) ABSTRACT

Systems, methods, and circuits utilize one or multiple data-stream watchdog codes for verifying a temporal state of data from a sensor system. A data-stream watchdog system can includes a sensor system configured to detect physical phenomena and produce corresponding output signals; a memory structure configured to store the output signals as sequential data on a repeating cycle, a watchdog code generator configured to insert a watchdog code into the stored sequential data and update the watchdog code periodically, and a data transmitter configured to receive the sequential data with included watchdog code from the memory structure and transmit the sequential data with the included watchdog code over a physical data channel each cycle of the repeating cycle. An application system receives the data and a watchdog code checker checks whether the watchdog code in the sequential data is correct and produces an error indication when the watchdog code is incorrect.

36 Claims, 5 Drawing Sheets

(56) References Cited

U.S. PATENT DOCUMENTS

| | | | |
|---|---|---|---|
| 6,894,823 B2 | 5/2005 | Taylor et al. | |
| 6,989,921 B2 | 1/2006 | Bernstein et al. | |
| 7,015,780 B2 | 3/2006 | Bernstein et al. | |
| 7,160,753 B2 | 1/2007 | Williams, Jr. | |
| 7,253,614 B2 | 8/2007 | Forrest et al. | |
| 7,321,649 B2 | 1/2008 | Lee | |
| 7,432,537 B1 | 10/2008 | Huntington | |
| 7,504,053 B1 | 3/2009 | Alekel | |
| 7,519,891 B2 * | 4/2009 | Zimmerman | G11C 29/022 714/738 |
| 7,605,623 B2 | 10/2009 | Yun et al. | |
| 7,724,050 B2 | 5/2010 | Lee | |
| 7,764,719 B2 | 7/2010 | Munroe et al. | |
| 7,782,911 B2 | 8/2010 | Munroe et al. | |
| 7,787,262 B2 | 8/2010 | Mangtani et al. | |
| 7,852,549 B2 | 12/2010 | Alekel et al. | |
| 7,885,298 B2 | 2/2011 | Munroe | |
| 7,990,194 B2 | 8/2011 | Shim | |
| 7,994,421 B2 | 8/2011 | Williams et al. | |
| 8,207,484 B1 | 6/2012 | Williams | |
| 8,319,307 B1 | 11/2012 | Williams | |
| 8,570,372 B2 | 10/2013 | Russell | |
| 8,597,544 B2 | 12/2013 | Alekel | |
| 8,630,036 B2 | 1/2014 | Munroe | |
| 8,630,320 B2 | 1/2014 | Munroe et al. | |
| 8,729,890 B2 | 5/2014 | Donovan et al. | |
| 8,730,564 B2 | 5/2014 | Alekel | |
| 8,743,453 B2 | 6/2014 | Alekel et al. | |
| 8,760,499 B2 | 6/2014 | Russell | |
| 8,766,682 B2 | 7/2014 | Williams | |
| 8,853,639 B2 | 10/2014 | Williams, Jr. | |
| 8,917,128 B1 | 12/2014 | Baek et al. | |
| 9,121,762 B2 | 9/2015 | Williams et al. | |
| 9,164,826 B2 | 10/2015 | Fernandez | |
| 9,197,233 B2 | 11/2015 | Gaalema et al. | |
| 9,269,845 B2 | 2/2016 | Williams et al. | |
| 9,329,057 B2 | 5/2016 | Foletto et al. | |
| 9,368,933 B1 | 6/2016 | Nijjar et al. | |
| 9,397,469 B1 | 7/2016 | Nijjar et al. | |
| 9,447,299 B2 | 9/2016 | Schut et al. | |
| 9,451,554 B1 | 9/2016 | Singh et al. | |
| 9,466,745 B2 | 10/2016 | Williams et al. | |
| 9,520,871 B2 | 12/2016 | Eagen et al. | |
| 9,553,216 B2 | 1/2017 | Williams et al. | |
| 9,591,238 B2 | 3/2017 | Lee et al. | |
| 9,621,041 B2 | 4/2017 | Sun et al. | |
| 9,693,035 B2 | 6/2017 | Williams et al. | |
| 9,759,602 B2 | 9/2017 | Williams | |
| 9,804,264 B2 | 10/2017 | Villeneuve et al. | |
| 9,810,775 B1 | 11/2017 | Welford et al. | |
| 9,810,777 B2 | 11/2017 | Williams et al. | |
| 9,810,786 B1 | 11/2017 | Welford et al. | |
| 9,812,838 B2 | 11/2017 | Villeneuve et al. | |
| 9,823,353 B2 | 11/2017 | Eichenholz et al. | |
| 9,835,490 B2 | 12/2017 | Williams et al. | |
| 9,841,495 B2 | 12/2017 | Campbell et al. | |
| 9,843,157 B2 | 12/2017 | Williams | |
| 9,847,441 B2 | 12/2017 | Huntington | |
| 9,857,468 B1 | 1/2018 | Eichenholz et al. | |
| 9,869,754 B1 | 1/2018 | Campbell et al. | |
| 9,874,635 B1 | 1/2018 | Eichenholz et al. | |
| 9,897,687 B1 | 2/2018 | Campbell et al. | |
| 9,905,992 B1 | 2/2018 | Welford et al. | |
| 9,910,088 B2 | 3/2018 | Milano et al. | |
| 9,923,331 B2 | 3/2018 | Williams | |
| 9,941,433 B2 | 4/2018 | Williams et al. | |
| 9,958,545 B2 | 5/2018 | Eichenholz et al. | |
| 9,989,629 B1 | 6/2018 | LaChapelle | |
| 9,995,622 B2 | 6/2018 | Williams | |
| 10,003,168 B1 | 6/2018 | Villeneuve | |
| 10,007,001 B1 | 6/2018 | LaChapelle et al. | |
| 10,012,732 B2 | 7/2018 | Eichenholz et al. | |
| 10,056,909 B1 | 8/2018 | Qi et al. | |
| 10,061,019 B1 | 8/2018 | Campbell et al. | |
| 10,073,136 B2 | 9/2018 | Milano et al. | |
| 10,088,559 B1 | 10/2018 | Weed et al. | |
| 10,094,925 B1 | 10/2018 | LaChapelle | |
| 10,110,128 B2 | 10/2018 | Raval et al. | |
| 10,114,111 B2 | 10/2018 | Russell et al. | |
| 10,121,813 B2 | 11/2018 | Eichenholz et al. | |
| 10,139,478 B2 | 11/2018 | Gaalema et al. | |
| 10,156,461 B2 | 12/2018 | Snyder et al. | |
| 10,169,678 B1 | 1/2019 | Sachdeva et al. | |
| 10,169,680 B1 | 1/2019 | Sachdeva et al. | |
| 10,175,345 B2 | 1/2019 | Rhee et al. | |
| 10,175,697 B1 | 1/2019 | Sachdeva et al. | |
| 10,191,155 B2 | 1/2019 | Curatu | |
| 10,209,359 B2 | 2/2019 | Russell et al. | |
| 10,211,592 B1 | 2/2019 | Villeneuve et al. | |
| 10,211,593 B1 | 2/2019 | Lingvay et al. | |
| 10,217,889 B2 | 2/2019 | Dhulla et al. | |
| 10,218,144 B2 | 2/2019 | Munroe et al. | |
| 10,241,198 B2 | 3/2019 | LaChapelle et al. | |
| 10,254,388 B2 | 4/2019 | LaChapelle et al. | |
| 10,254,762 B2 | 4/2019 | McWhirter et al. | |
| 10,267,898 B2 | 4/2019 | Campbell et al. | |
| 10,267,899 B2 | 4/2019 | Weed et al. | |
| 10,267,918 B2 | 4/2019 | LaChapelle et al. | |
| 10,275,689 B1 | 4/2019 | Sachdeva et al. | |
| 10,291,125 B2 | 5/2019 | Raval et al. | |
| 10,295,668 B2 | 5/2019 | LaChapelle et al. | |
| 10,310,058 B1 | 6/2019 | Campbell et al. | |
| 10,324,170 B1 | 6/2019 | Engberg, Jr. et al. | |
| 10,324,185 B2 | 6/2019 | McWhirter et al. | |
| 10,338,199 B1 | 7/2019 | McWhirter et al. | |
| 10,338,223 B1 | 7/2019 | England et al. | |
| 10,340,651 B1 | 7/2019 | Drummer et al. | |
| 10,345,437 B1 | 7/2019 | Russell et al. | |
| 10,345,447 B1 | 7/2019 | Hicks | |
| 10,348,051 B1 | 7/2019 | Shah et al. | |
| 10,386,489 B2 | 8/2019 | Albelo et al. | |
| 10,394,243 B1 | 8/2019 | Ramezani et al. | |
| 10,401,480 B1 | 9/2019 | Gaalema et al. | |
| 10,401,481 B2 | 9/2019 | Campbell et al. | |
| 10,418,776 B2 | 9/2019 | Welford et al. | |
| 10,445,599 B1 | 10/2019 | Hicks | |
| 10,451,716 B2 | 10/2019 | Hughes et al. | |
| 10,473,788 B2 | 11/2019 | England et al. | |
| 10,481,181 B2 | 11/2019 | Bussing et al. | |
| 10,481,605 B1 | 11/2019 | Maila et al. | |
| 10,488,458 B2 | 11/2019 | Milano et al. | |
| 10,488,496 B2 | 11/2019 | Campbell et al. | |
| 10,491,885 B1 | 11/2019 | Hicks | |
| 10,498,384 B2 | 12/2019 | Briano | |
| 10,502,831 B2 | 12/2019 | Eichenholz | |
| 10,503,172 B2 | 12/2019 | England et al. | |
| 10,509,127 B2 | 12/2019 | England et al. | |
| 10,514,462 B2 | 12/2019 | England et al. | |
| 10,520,602 B2 | 12/2019 | Villeneuve et al. | |
| 10,523,884 B2 | 12/2019 | Lee et al. | |
| 10,535,191 B2 | 1/2020 | Sachdeva et al. | |
| 10,539,665 B1 | 1/2020 | Danziger et al. | |
| 10,545,240 B2 | 1/2020 | Campbell et al. | |
| 10,551,485 B1 | 2/2020 | Maheshwari et al. | |
| 10,551,501 B1 | 2/2020 | LaChapelle | |
| 10,557,939 B2 | 2/2020 | Campbell et al. | |
| 10,557,940 B2 | 2/2020 | Eichenholz et al. | |
| 10,571,567 B2 | 2/2020 | Campbell et al. | |
| 10,571,570 B1 | 2/2020 | Paulsen et al. | |
| 10,578,720 B2 | 3/2020 | Hughes et al. | |
| 10,591,600 B2 | 3/2020 | Villeneuve et al. | |
| 10,591,601 B2 | 3/2020 | Hicks et al. | |
| 10,606,270 B2 | 3/2020 | England et al. | |
| 10,613,158 B2 | 4/2020 | Cook et al. | |
| 10,627,495 B2 | 4/2020 | Gaalema et al. | |
| 10,627,512 B1 | 4/2020 | Hicks | |
| 10,627,516 B2 | 4/2020 | Eichenholz | |
| 10,627,521 B2 | 4/2020 | England et al. | |
| 10,634,735 B2 | 4/2020 | Kravljaca et al. | |
| 10,636,285 B2 | 4/2020 | Haas et al. | |
| 10,641,874 B2 | 5/2020 | Campbell et al. | |
| 10,663,564 B2 | 5/2020 | LaChapelle | |
| 10,663,585 B2 | 5/2020 | McWhirter | |
| 10,677,897 B2 | 6/2020 | LaChapelle et al. | |

(56) References Cited

U.S. PATENT DOCUMENTS

| | | | |
|---|---|---|---|
| 10,677,900 | B2 | 6/2020 | Russell et al. |
| 10,684,360 | B2 | 6/2020 | Campbell |
| 10,908,190 | B2 | 2/2021 | Bussing et al. |
| 10,948,537 | B2 | 3/2021 | Forrest et al. |
| 11,029,176 | B2 | 6/2021 | Geiger et al. |
| 11,115,244 | B2 | 9/2021 | Briano et al. |
| 11,177,814 | B2 | 11/2021 | Kim et al. |
| 11,252,359 | B1 | 2/2022 | Huntington et al. |
| 11,313,899 | B2 | 4/2022 | Milano et al. |
| 11,409,000 | B1 | 8/2022 | Behzadi et al. |
| 11,451,234 | B1 * | 9/2022 | Austin ............... H03L 7/0812 |
| 2003/0112913 | A1 | 6/2003 | Balasubramanian |
| 2004/0169753 | A1 | 9/2004 | Gulbransen et al. |
| 2005/0172167 | A1 * | 8/2005 | Driscoll ............... H04L 12/44 |
| | | | 714/26 |
| 2007/0257193 | A1 | 11/2007 | Macciocchi |
| 2011/0270543 | A1 | 11/2011 | Schmidt et al. |
| 2013/0169329 | A1 | 7/2013 | Searles |
| 2013/0176061 | A1 | 7/2013 | Haerle et al. |
| 2014/0094993 | A1 | 4/2014 | Johnson |
| 2016/0013796 | A1 | 1/2016 | Choi |
| 2016/0054434 | A1 | 2/2016 | Williams et al. |
| 2017/0250694 | A1 | 8/2017 | Im et al. |
| 2018/0054206 | A1 | 2/2018 | Im et al. |
| 2018/0068699 | A1 | 3/2018 | Choi et al. |
| 2018/0069367 | A1 | 3/2018 | Villeneuve et al. |
| 2018/0191356 | A1 | 7/2018 | Kesarwani |
| 2018/0191979 | A1 | 7/2018 | Mu et al. |
| 2018/0284239 | A1 | 10/2018 | LaChapelle et al. |
| 2018/0284240 | A1 | 10/2018 | LaChapelle et al. |
| 2018/0284275 | A1 | 10/2018 | LaChapelle |
| 2018/0284280 | A1 | 10/2018 | Eichenholz et al. |
| 2019/0033460 | A1 | 1/2019 | Lipson |
| 2019/0310368 | A1 | 10/2019 | LaChapelle |
| 2021/0124050 | A1 | 4/2021 | Puglia et al. |
| 2021/0132229 | A1 | 5/2021 | Milkov et al. |
| 2022/0236376 | A1 | 7/2022 | Li et al. |
| 2022/0245018 | A1 * | 8/2022 | Debosque ............... G06F 13/20 |
| 2022/0294172 | A1 | 9/2022 | Taylor et al. |
| 2023/0315555 | A1 * | 10/2023 | Myers ............... G06F 11/0709 |
| | | | 700/79 |

OTHER PUBLICATIONS

Response to U.S. Final Office Action dated Oct. 20, 2023 for U.S. Appl. No. 17/400,300; Response filed Oct. 24, 2023; 8 Pages.
U.S. Notice of Allowance dated Nov. 8, 2023 for U.S. Appl. No. 17/400,300; 10 Pages.
U.S. Appl. No. 17/197,314, filed Mar. 10, 2021, Taylor et al.
U.S. Appl. No. 17/197,328, filed Mar. 30, 2021, Taylor et al.
U.S. Appl. No. 17/230,253, filed Apr. 14, 2021, Judkins, III et al.
U.S. Appl. No. 17/230,276, filed Apr. 14, 2021, Cadugan.
U.S. Appl. No. 17/230,277, filed Apr. 14, 2021, Judkins, III et al.
U.S. Appl. No. 17/352,829, filed Jun. 21, 2021, Huntington et al.
U.S. Appl. No. 17/352,937, filed Jun. 21, 2021, Cadugan et al.
U.S. Appl. No. 17/376,607, filed Jul. 15, 2021, Stewart et al.
U.S. Appl. No. 17/400,300, filed Aug. 12, 2021, Myers et al.
U.S. Appl. No. 17/402,065, filed Aug. 13, 2021, Lee et al.
U.S. Appl. No. 17/566,763, filed Dec. 31, 2021, Huntington et al.
U.S. Appl. No. 17/651,250, filed Feb. 16, 2022, Marshall.
U.S. Appl. No. 17/653,881, filed Mar. 8, 2022, Keuleyan et al.
U.S. Appl. No. 17/656,977, filed Mar. 29, 2022, Myers et al.
U.S. Appl. No. 17/656,978, filed Mar. 29, 2022, Myers et al.
U.S. Appl. No. 17/656,981, filed Mar. 29, 2022, Myers et al.
U.S. Appl. No. 17/660,221, filed Apr. 22, 2022, Filippini et al.
U.S. Non-Final Office Action dated Nov. 23, 2022 for U.S. Appl. No. 17/400,300; 23 Pages.
U.S. Notice of Allowance dated Jan. 25, 2023 for U.S. Appl. No. 17/660,221; 7 pages.
Response to U.S. Non-Final Office Action dated Nov. 23, 2022 for U.S. Appl. No. 17/400,300; Response filed Mar. 8, 2023; 9 Pages.
U.S. Notice of Allowance dated Oct. 24, 2022 for U.S. Appl. No. 17/660,221; 9 pages.
Response to U.S. Non-Final Office Action dated May 4, 2023 for U.S. Appl. No. 17/400,300; Response filed Aug. 3, 2023; 11 Pages.
U.S. Non-Final Office Action dated May 4, 2023 for U.S. Appl. No. 17/400,300; 25 Pages.
U.S. Appl. No. 17/645,118, filed Dec. 20, 2021, Babushkin, et al.
U.S. Appl. No. 17/648,702, filed Jan. 24, 2022, Lee et al.
U.S. Appl. No. 17/659,033, filed Apr. 13, 2022, Cadugan et al.
U.S. Appl. No. 17/659,035, filed Apr. 13, 2022, Cadugan et al.
U.S. Appl. No. 17/805,070, filed Jun. 2, 2022, Myers et al.
U.S. Appl. No. 17/809,990, filed Jun. 30, 2022, Quirk et al.

* cited by examiner

DATA STREAM WATCHDOG INJECTION

BACKGROUND

As is known in the art, lidar imaging systems periodically illuminate target areas or regions with optical energy and detect reflected energy ("returns") in a defined field-of-view (FOV). Lidar systems can use a single laser or multiple lasers to transmit pulses, and single or multiple detectors for sensing and timing the pulse returns. A lidar system's FOV is the portion of the scene that its detectors can sense in a single observation. Lidar systems typically continuously refresh time or range data about the FOV. If any error causes the data to not refresh and instead repeat use of previous data, an unsafe condition may develop where a system utilizing the lidar ranging data could potentially take unsafe actions or fail to respond to changing conditions in the operational FOV of the lidar system. Correctly detecting objects in the FOV or identifying the lidar system's inability to detect objects may be of critical significance for safe operation for lidar systems used in certain applications, such as automotive or aerospace applications.

SUMMARY

One aspect of the present disclosure includes a data-stream watchdog system. The data-stream watchdog system can include a sensor system configured to detect physical phenomena and produce corresponding output signals; a memory structure configured to store the output signals as sequential data on a repeating cycle, a watchdog code generator configured to insert a watchdog code into the stored sequential data and update the watchdog code periodically, a data transmission system configured to receive the sequential data with included watchdog code from the memory structure and transmit the sequential data with the included watchdog code over a physical data channel each cycle of the repeating cycle, a data receiver system configured to read the sequential data with included watchdog code from the physical data channel, a receive buffer configured to store the sequential data with the included watchdog code from the data receiver system each cycle of the repeating cycle, and a watchdog code checker configured to check whether the watchdog code in the sequential data from the receive buffer is correct and produce an error indication when the watchdog code is incorrect. In example embodiments, the watchdog code can be a periodically repeating code of given or specified length (e.g., 4 bits, 8 bits, 12 bits, etc.), which repeats on a code cycle. Other embodiments of this aspect can include corresponding computer systems, apparatus, and computer programs recorded on one or more computer storage devices, each configured to perform the actions of the methods.

Implementations may include one or more of the following features. The memory structure of the system may include a frame buffer. The memory structure may include a line buffer. The memory structure may include a plurality of memory units configured in parallel. Each memory unit can correspond to a respective subset of the sensor system output signals. The memory structure further may include one or more memory units configured in series with the plurality of memory units configured in parallel. The data transmission system can be configured to multiplex the sequential data from the entire memory structure for each cycle of the repeating cycle. The system may include a watchdog aggregator configured to aggregate the watchdog codes from the respective parallel memories and insert an aggregate watchdog code into the sequential data for transmission over the physical data channel. The watchdog code generator can be configured to implement a counter. The watchdog code generator can be configured to implement an alternating bit generator. The physical data channel may include a serial link. The physical data channel may include a parallel link. The parallel link may include multiple serial links. The sensor system can include a single sensor. The sensor system can include a plurality of sensors. The plurality of sensors can include a plurality of optical detectors. The plurality of optical detectors may include infrared detectors. The sensor system may include a lidar range data collection system configured to detect successive lidar returns and produce respective output signals.

The watchdog code generator may be configured to update the watchdog code and insert the updated watchdog code into the sequential data each time the sequential data is written to the memory structure. The watchdog code generator can be configured to update the watchdog code every cycle of the repeating cycle and insert the updated watchdog code into the sequential data when the sequential data is written to the memory structure. The watchdog code checker can be configured to receive the watchdog code from the watchdog code generator over a communication channel separate from the physical data channel and to compare the watchdog code received from the watchdog code generator to the watchdog code included with the sequential data. The system can generate a warning or flag in the event the comparison indicates a fault. The watchdog code checker can be configured to receive the watchdog code and/or a watchdog code update algorithm from the watchdog code generator over a communication channel separate from the physical data channel. Implementations of the described techniques may include hardware, a method or process, or computer software on a computer-accessible medium.

Another aspect includes a method of embedding a watchdog signal in a data stream from a sensor system having one or more sensors. The method also includes storing signals from the sensor system in a memory structure as sequential data on a repeating cycle; inserting an updatable watchdog code into the sequential data, transmitting the sequential data with included watchdog code over a physical data channel each cycle of the repeating cycle, receiving the sequential data with included watchdog code in a receive buffer that is updated each cycle of the repeating cycle, checking whether the watchdog code in the received sequential data is correct, and generating an error indication when the watchdog code in the received sequential data is incorrect. In example embodiments, the watchdog code can be generated as a periodically repeating code of given or specified length (e.g., 4 bits, 8 bits, 12 bits, etc.), which repeats on a code cycle. Other embodiments of this aspect can include corresponding computer systems, apparatus, and computer programs recorded on one or more computer storage devices, each configured to perform the actions of the methods.

Implementations may include one or more of the following features. Storing signals from the sensor system may include storing range data from a lidar range data collection system configured to detect successive lidar returns and produce respective output signals. The memory structure may include a plurality of parallel memory units, the method may include multiplexing the sequential data from all of the memory units of the memory structure each cycle of the repeating cycle. Inserting the watchdog code into the sequential data may include inserting the aggregate watchdog code into the sequential data for transmission over the physical data channel. Inserting the watchdog code includes implementing a counter. Inserting the watchdog code can include implementing an alternating bit generator. The method may include updating the watchdog code periodically. Updating the watchdog code periodically may include updating the watchdog code for each cycle of the repeating cycle. The method may include detecting a memory write event each time the sequential data is written to the memory structure. The updated watchdog code can be inserted into the sequential data in response to detecting the memory write event. The watchdog code checker can receive the watchdog code from the watchdog code generator over a communication channel separate from the physical data channel and can compare the watchdog code received from the watchdog code generator to the watchdog code included with the sequential data. A warning or flag can be generated in the event the comparison indicates a fault. The watchdog code checker can receive the watchdog code and/or a watchdog code update algorithm from the watchdog code generator over a communication channel separate from the physical data channel.

Implementations of the described techniques may include hardware, a method or process, or computer software on a computer-accessible medium. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Example embodiments of the present disclosure are directed to and provide watchdog systems, circuits, and/or methods for, e.g., specification of an Application Safety Integration Level (ASIL) in compliance with a safety standard such as ISO 26262 or the like.

The features and advantages described herein are not all-inclusive; many additional features and advantages will be apparent to one of ordinary skill in the art in view of the drawings, specification, and claims. Moreover, it should be noted that the language used in the specification has been selected principally for readability and instructional purposes, and not to limit in any way the scope of the present disclosure, which is susceptible of many embodiments. What follows is illustrative, but not exhaustive, of the scope of the present disclosure.

BRIEF DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Prior to describing example embodiments of the present disclosure some information is provided. Laser ranging systems can include laser radar (ladar), light-detection and ranging (lidar), and range-finding systems, which are generic terms for the same class of instruments that use light to measure the distance to objects in a scene. This concept is similar to radar, except optical signals are used instead of radio waves. Similar to radar, a laser ranging and imaging system emits a pulse toward a particular location and measures the return echoes (reflections) to extract the range.

Laser ranging systems generally work by emitting a laser pulse and recording the time it takes for the laser pulse to travel to a target, reflect, and return to a photoreceiver, which time is commonly referred to as the "time of flight." The laser ranging instrument records the time of the outgoing pulse—either from a trigger or from calculations that use measurements of the scatter from the outgoing laser light—and then records the time that a laser pulse returns. The difference between these two times is the time of flight to and from the target. Using the speed of light, the round-trip time of the pulses is used to calculate the distance to the target.

Lidar systems may scan the beam (or, successive pulses) across a target area to measure the distance to multiple points across the field of view, producing a full three-dimensional range profile of the surroundings. More advanced flash lidar cameras, for example, contain an array of detector elements, each able to record the time of flight to objects in their field of view.

Lidar systems can use a single laser or multiple lasers to transmit pulses, and single or multiple detectors for sensing and timing the pulse returns. A lidar system's field-of-regard (FOR) is the portion of a scene that it can sense over multiple observations, whereas its field-of-view (FOV) is the portion of the scene that its detectors can sense in a single observation. Depending on type of lidar system, the FOV of its detectors may be scanned over its FOR over multiple observations ("scanned lidar"), or in a "staring" system the detector FOV may match the FOR, potentially updating the scene image with every observation. However, during a single observation, a lidar system can only sense the parts of its detector FOV that are illuminated by its laser. The area of the scene illuminated by a single laser pulse may be scanned over the detector FOV, necessitating multiple observations to image the part of the scene within that FOV, or it may be matched to the detector FOV ("flash lidar") and either scanned along with the FOV over a larger FOR, or it may illuminate the entire FOR in a staring flash lidar system. These lidar system architectures differ with respect to how much laser energy per pulse is needed, how fast the laser must pulse, and how rapidly a three-dimensional image of a given FOR can be collected.

In scanned lidar systems, the returns collected by each detector of the sensor (each constituting a point in the FOR) are aggregated over multiple laser shots to build up a "point cloud" in three-dimensional space that maps the topography of the scene. In staring flash lidar systems a complete point cloud is collected with every laser shot. Lidar system architecture with respect to scanning versus staring detectors and scanning versus flash illumination are driven by issues such as the required angular span and resolution of the scene to be imaged, the available power and achievable pulse repetition frequency of the laser, the range over which the lidar system must be effective, and the desired image update rate, among many other factors. Often it is impractical to supply sufficient laser pulse energy per pixel to implement long-range flash lidar in a high-resolution staring system, whereas illuminating too small of a FOV limits the image update rate of high-resolution, wide-FOR scanned lidar systems. Lidar systems that match sensor FOV and laser illumination to the full extent of the FOR along one axis of the scene, such as angle-of-elevation, while scanning across the FOR along the other axis, such as azimuthal angle, provide an engineering compromise that limits required laser power while supporting very high image resolution and update rates.

When using light pulses to create images, the emitted pulse may intercept multiple objects, at different orientations, as the pulse traverses a 3D volume of space. The reflected (or echoed) laser-pulse waveform contains a temporal and amplitude imprint of the scene. By sampling the light reflections or echoes, a record of the interactions of the emitted pulse is extracted with the intercepted objects of the scene, allowing an accurate multi-dimensional image to be created. To simplify signal processing and reduce data storage, laser ranging and imaging can be dedicated to discrete-return systems, which record only the time of flight (TOF) of the first, or a few, individual target returns to obtain angle-angle-range images.

In a discrete-return system, each recorded return corresponds, in principle, to an individual laser reflection (i.e., an echo from one particular reflecting surface, for example, a tree, pole or building). By recording just a few individual ranges, discrete-return systems simplify signal processing and reduce data storage, but they do so at the expense of lost target and scene reflectivity data. Because laser-pulse energy has significant associated costs and drives system size and weight, recording the TOF and pulse amplitude of more than one laser pulse return per transmitted pulse, to obtain angle-angle-range-intensity images, increases the amount of captured information per unit of pulse energy. All other things equal, capturing the full pulse return waveform offers significant advantages, such that the maximum data is extracted from the investment in average laser power. In full-waveform systems, each backscattered laser pulse received by the system is digitized at a high sampling rate (e.g., 500 MHz to 1.5 GHz). This process generates digitized waveforms (amplitude versus time) that may be processed to achieve higher-fidelity 3D images.

Of the various laser ranging instruments available, those with single-element photoreceivers generally obtain range data along a single range vector, at a fixed pointing angle. This type of instrument—which is, for example, commonly used by golfers and hunters—either obtains the range (R) to one or more targets along a single pointing angle or obtains the range and reflected pulse intensity (I) of one or more objects along a single pointing angle, resulting in the collection of pulse range-intensity data, $(R,I)_i$, where i indicates the number of pulse returns captured for each outgoing laser pulse.

More generally, laser ranging instruments can collect ranging data over a portion of the solid angles of a sphere, defined by two angular coordinates (e.g., azimuth and elevation), which can be calibrated to three-dimensional (3D) rectilinear cartesian coordinate grids; these systems are generally referred to as 3D lidar and ladar instruments. The terms "lidar" and "ladar" are often used synonymously and, for the purposes of this discussion, the terms "3D lidar," "scanned lidar," or "lidar" are used to refer to these systems without loss of generality. 3D lidar instruments obtain three-dimensional (e.g., angle, angle, range) data sets. Conceptually, this would be equivalent to using a rangefinder and scanning it across a scene, capturing the range of objects in the scene to create a multi-dimensional image. When only the range is captured from the laser pulse returns (reflections), these instruments obtain a 3D data set (e.g., angle, angle, range)$_n$, where the index n is used to indicate that a series of range-resolved laser pulse returns can be collected, not just the first reflection.

Some 3D lidar instruments are also capable of collecting the intensity of the reflected pulse returns generated by the objects located at the resolved (angle, angle, range) objects in the scene. When both the range and intensity are recorded, a multi-dimensional data set (e.g., angle, angle, (range-intensity)$_n$) is obtained. This is analogous to a video camera in which, for each instantaneous field of view (FOV), each effective camera pixel captures both the color and intensity of the scene observed through the lens. However, 3D lidar systems, instead capture the range to the object and the reflected pulse intensity.

Lidar transmitters produce emissions (laser outputs) that are generally invisible to the human eye. For example, lidar systems can include different types of lasers operating at different wavelengths, including those that are not visible (e.g., wavelengths of 840 nm or 905 nm), in the near-infrared (e.g., at wavelengths of 1064 nm or 1550 nm), and in the thermal infrared including wavelengths known as the "eye-safe" spectral region (generally those beyond 1300-nm), where ocular damage is less likely to occur. However, when the wavelength of the laser is close to the range of sensitivity of the human eye—the "visible" spectrum, or roughly 350 nm to 730 nm, it is desirable to lower the energy of the laser pulse and/or the average power of the laser below certain thresholds (e.g., as recognized by certain safety standards) to avoid causing ocular damage.

Certain industry standards and/or government regulations define "eye safe" energy density or power levels for laser emissions, including those at which lidar systems typically operate. For example, industry-standard safety regulations IEC 60825-1: 2014 and/or ANSI Z136.1-2014 define maximum power levels for laser emissions to be considered "eye safe" under all conditions of normal operation (i.e., "Class 1"), including for different lidar wavelengths of operation. The power limits for eye safe use vary according to wavelength due to absorption characteristics of the structure of the human eye. For example, because the aqueous humor and lens of the human eye readily absorb energy at 1550 nm, little energy reaches the retina at that wavelength. Comparatively little energy is absorbed, however, by the aqueous humor and lens at 840 nm or 905 nm, meaning that most incident energy at that wavelength reaches and can damage the retina. Thus, a laser operating at, for example, 1550 nm, can—without causing ocular damage—generally have 200 times to 1 million times more laser pulse energy than a laser operating at 840 nm or 905 nm.

One challenge for a lidar system is detecting poorly reflective objects at long distance, which requires transmitting a laser pulse with enough energy that the return signal—reflected from the distant target—is of sufficient magnitude to be detected. To determine the minimum required laser transmission power, several factors should be considered. For instance, the magnitude of the pulse returns scattering from the diffuse objects in a scene is proportional to their range and the intensity of the return pulses generally scales with distance according to $1/R^4$ for small objects and $1/R^2$ for larger objects; yet, for highly-specularly reflecting objects (i.e., those objects that are not diffusively-scattering objects), the collimated laser beams can be directly reflected back, largely unattenuated. This means that—if the laser pulse is transmitted, then reflected from a target that is immediately in front of the transmitting laser, e.g., 1 meter away—it is possible that the full energy (J) from the laser pulse will be reflected into the photoreceiver; but—if the laser pulse is transmitted, then reflected from a target that is farther away, e.g., 333 meters away—it is possible that the return will have a pulse with energy approximately $10^{12}$ weaker than the transmitted energy. To provide an indication of the magnitude of this scale, the 12 orders of magnitude ($10^{12}$) is roughly the equivalent of: the number of inches from the Earth to the sun, or the ratio of the luminous output from a phosphorescent watch dial, one hour in the dark, to the luminous output of the solar disk at noon.

In many cases, lidar systems utilize highly sensitive receivers (photoreceivers) to increase the system sensitivity and reduce the amount of laser pulse energy that is needed to reach (and return from) poorly reflective targets at the longest distances required, and to maintain eye-safe operation. Some variants of these detectors include those that incorporate photodiodes, and/or offer gain, such as avalanche photodiodes (APDs) or single-photon avalanche detectors (SPADs). These variants can be configured as single-element detectors, —segmented-detectors, linear detector arrays, or area detector arrays. Using highly sensitive detectors such as APDs or SPADs reduces the amount of laser pulse energy required for long-distance ranging to poorly reflective targets. A technological challenge of these photodetectors is that they should also be able to accommodate the incredibly large dynamic range of signal amplitudes.

As dictated by the properties of the optics, the focus of a laser return changes as a function of range; as a result, near objects are often out of focus. Furthermore, also as dictated by the properties of the optics, the location and size of the "blur"—i.e., the spatial extent of the optical signal—changes as a function of range, much like in a standard camera. These challenges are commonly addressed by using large detectors, segmented detectors, or multi-element detectors to capture all of the light or just a portion of the light over the full-distance range of objects. It is generally advisable to design the optics such that reflections from close objects are blurred, so that a portion of the optical energy does not reach the detector or is spread between multiple detectors. This design strategy can reduce the dynamic range requirements of the detector and prevents the detector from damage.

Acquisition of the lidar imagery can include, for example, a 3D lidar system embedded in the front of car, where the 3D lidar system, includes a laser transmitter with any necessary optics, a single-element photoreceiver with any necessary dedicated or shared optics, and an optical scanner used to scan ("paint") the laser over the scene. Generating a full-frame 3D lidar range image—where the field of view is 20 degrees by 60 degrees and the angular resolution is 0.1 degrees (10 samples per degree)—can require emitting 120,000 pulses (20*10*60*10=120,000). When update rates of 30 frames per second are required, such as is commonly required for automotive lidar, roughly 3.6 million pulses per second must be generated and their returns captured.

There are many ways to combine and configure the elements of the lidar system—including considerations for the laser pulse energy, beam divergence, detector array size and array format (e.g., single element, linear (1D) array, or 2D array), and scanner to obtain a 3D image. If higher power lasers are deployed, pixelated detector arrays can be used, in which case the divergence of the laser would be mapped to a wider field of view relative to that of the detector array, and the laser pulse energy would need to be increased to match the proportionally larger field of view. For example, compared to the 3D lidar above, to obtain same-resolution 3D lidar images 30 times per second, a 120,000-element detector array (e.g., 200×600 elements) could be used with a laser that has pulse energy that is 120,000 times greater. The advantage of this "flash lidar" system is that it does not require an optical scanner; the disadvantages are that the larger laser results in a larger, heavier system that consumes more power, and that it is possible that the required higher pulse energy of the laser will be capable of causing ocular damage. The maximum average laser power and maximum pulse energy are limited by the requirement for the system to be eye-safe.

As noted above, while many lidar system operate by recording only the laser time of flight and using that data to obtain the distance to the first target return (closest) target, some lidar systems are capable of capturing both the range and intensity of one or multiple target returns created from each laser pulse. For example, for a lidar system that is capable of recording multiple laser pulse returns, the system can detect and record the range and intensity of multiple returns from a single transmitted pulse. In such a multi-pulse lidar system, the range and intensity of a return pulse from a from a closer-by object can be recorded, as well as the range and intensity of later reflection(s) of that pulse—one(s) that moved past the closer-by object and later reflected off of more-distant object(s). Similarly, if glint from the sun reflecting from dust in the air or another laser pulse is detected and mistakenly recorded, a multi-pulse lidar system allows for the return from the actual targets in the field of view to still be obtained.

The amplitude of the pulse return is primarily dependent on the specular and diffuse reflectivity of the target, the size of the target, and the orientation of the target. Laser returns from close, highly-reflective objects, are many orders of magnitude greater in intensity than the intensity of returns from distant targets. Many lidar systems require highly sensitive photodetectors, for example avalanche photodiodes (APDs), which along with their CMOS amplification circuits. So that distant and poorly-reflective targets may be detected, the photoreceiver components may be optimized for high conversion gain. Largely because of their high sensitivity, these detectors may be damaged by very intense laser pulse returns.

For example, if an automotive equipped with a front-end lidar system were to pull up behind another car at a stoplight, the reflection off of the license plate may be significant—perhaps $10^{12}$ higher than the pulse returns from targets at the distance limits of the lidar system. When a bright laser pulse is incident on the photoreceiver, the large current flow through the photodetector can damage the detector, or the large currents from the photodetector can cause the voltage to exceed the rated limits of the CMOS electronic amplification circuits, causing damage. For this reason, it is generally advisable to design the optics such that the reflections from close objects are blurred, so that a portion of the optical energy does not reach the detector or is spread between multiple detectors. However, capturing the intensity of pulses over a larger dynamic range associated with laser ranging may be challenging because the signals are too large to capture directly. One can infer the intensity by using a recording of a bit-modulated output obtained using serial-bit encoding obtained from one or more voltage threshold levels. This technique is often referred to as time-over-threshold (TOT) recording or, when multiple-thresholds are used, multiple time-over-threshold (MTOT) recording.

Figure 1:
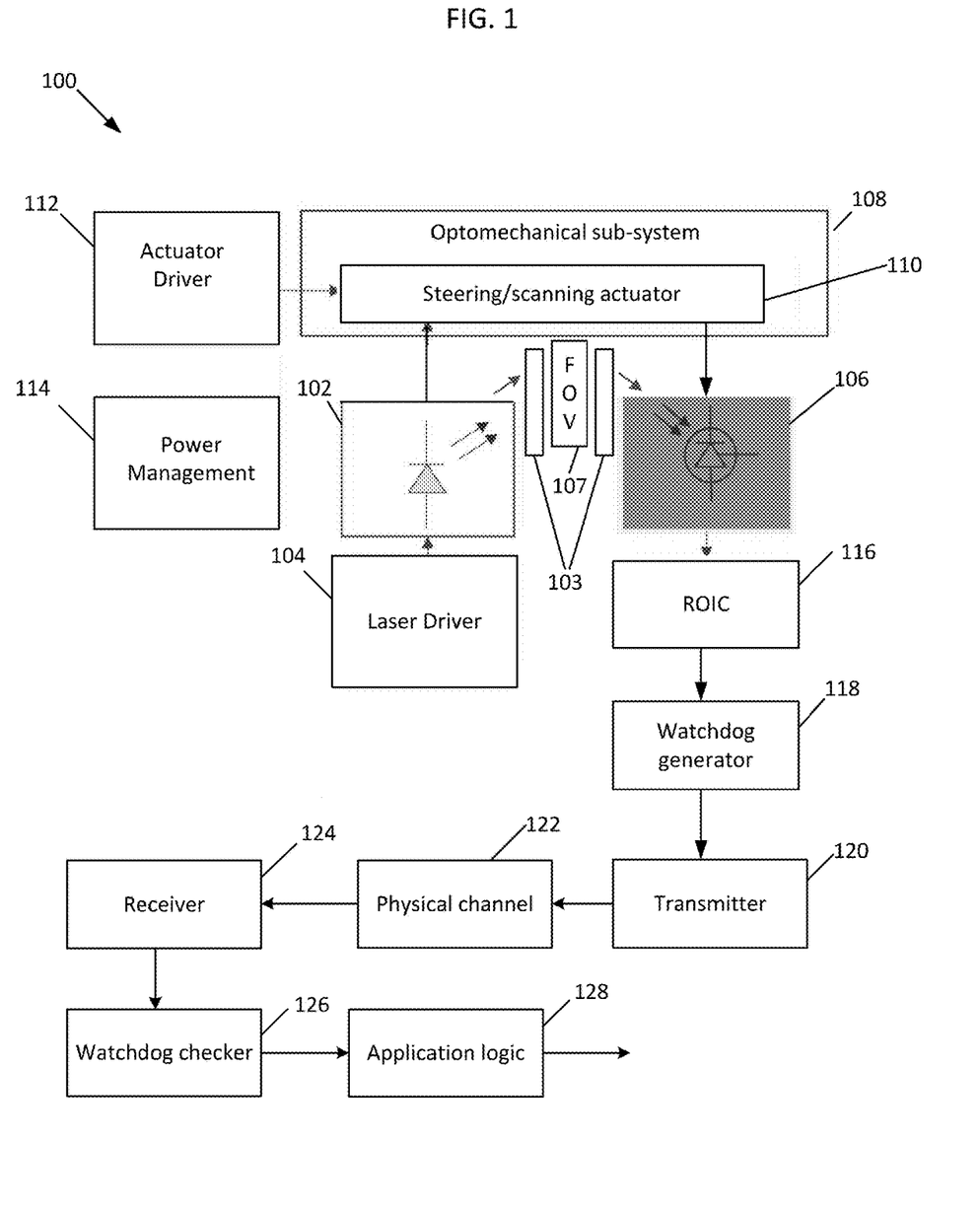
FIG. 1 is a block diagram showing major components of an example embodiment of a lidar system, in accordance with the present disclosure.

FIG. 1 is a block diagram showing major components of an example embodiment of a lidar system 100, in accordance with the present disclosure. System 100 can be a scanned lidar system in some embodiments, a flash lidar system in other embodiments, or a hybrid (scanning/flash) system in still other embodiments. System 100 includes an illumination source 102, shown as laser diode, connected to laser driver 104. Optics 103 are shown and can be used for the illumination source 102 and/or receiver 106 (e.g., in monostatic or bistatic configurations). The illumination source (e.g., a laser or LED) 102 produces an output (e.g., one or more laser pulses). Appropriate pumping energy may be supplied by suitable sources, e.g., diodes lasers, for the case where laser 102 includes a non-semiconductor active medium. An optical receiver (e.g., detector) 106, shown as a representative photodiode, receives laser returns (reflections of the laser outputs) from objects and/or surfaces in the FOV 107.

The detector 106 can include an array of individual detectors, e.g., a one-dimensional array (1×N) or a two-dimensional array (M×N). A field-of-view (FOV) 107 of the detector is shown on the optical path between the laser (illumination source) 102 and the detector 106, which is directed to and "viewing" the FOV 107. Detector 106 operates to detect energy reflected from objects and/or surfaces in the FOV 107. An optomechanical subsystem 108, e.g., a steering/scanning actuator 110 for transmit beam steering, can be included to scan the illumination source 102 and detector 106 in one or more directions. An actuator driver 112 can control the movement of the actuator 110. While embodiments of system 100 can be configured as scanning lidar systems, other embodiments of system 100 can be configured as flash lidar systems not utilizing steering/scanning such that optomechanical subsystem 108 or subcomponents 110 and/or 112 may be omitted.

System 100 further includes a power management block 114, which provides and controls power to the system 100. Once received at the detector 106, the incident photons are converted by the detector 106 (e.g., photodiodes) to electrical signals, which can be read-out by the system for signal processing. A readout integrated circuit or circuitry (ROIC) 116 is shown connected to receiver (optical detector) 106 for receiving the output from the detector 106. ROIC 116 can be used for, e.g., amplification, discrimination, timing, and/or digitization. The term ROIC as used herein can include reference to a digital ROIC (DROIC) or a digital pixel ROIC (DPROIC) and embodiments of ROIC 116 can include or be configured as, e.g., a DROIC or a DPROIC. A watchdog code generator 118 can produce one or more watchdog codes and add the code(s) to the data from the detector 106. One or more additional signal processing blocks (not shown) may be used for further signal processing of the signals generated from the returns.

The data, with added watchdog code(s), can be transmitted by a transmitter 120 over a physical channel 122 to a receiver 124, e.g., in an application system. The physical channel 122 may be wired (e.g., include a wired link) in example embodiments, though it can also or alternatively include a wireless link in other embodiments. The (data) receiver 124 can receive the data, with included watchdog code(s), from the physical channel 122. A watchdog checker 126 can check the embedded watchdog code(s) to determine whether the watchdog code(s) is/are correct and/or whether the sensor data is reliable. The data can be passed to one or more systems or applications 128 for further use, e.g., for point cloud generation by an autonomous vehicle control system, etc. In example embodiments, watchdog code generator 118 and transmitter 120 may be included in ROIC 116. For example, in some embodiments, ROIC 116 can include all components between the photodetectors 106 and the physical channel 122 included on a single chip. In other embodiments, the noted components may be separate and/or discrete.

Implementation of lidar systems (e.g., similar to system 100) in automotive or other safety-sensitive applications can require meeting one or more safety standards such, e.g., ISO 26262, which includes specification of an Application Safety Integration Level (ASIL). In order to meet the high fault detectability standards required by safety standards such as ISO 26262, methods for detecting safety-critical faults and reporting them to a fault handling system may be beneficial. The faults may either be located within the lidar system or in systems relied-upon by the lidar system. Tests for such faults can facilitate meeting ASIL or other safety requirements.

One type of fault that can affect lidar systems may arise when the lidar image data (range data) is not updated to match a FOV that changes over time. Under such a fault scenario, the data processed by the lidar system is not truly representative of the system FOV at a given moment but instead represent an older or "stagnant" FOV. Correctly detecting objects in the FOV or identifying the lidar system's inability to detect objects may be critical for safe operation in some applications, e.g., automotive or aerospace. If any error causes the data to not refresh and instead repeat transmission of previous data, an unsafe condition may develop where a system utilizing the LiDAR ranging data may take unsafe actions or fail to respond to changing conditions in the operational FOV.

An aspect of the present disclosure is directed to and provides for embedding a watchdog signal or code, e.g., one or more watchdog codes, in data that is generated and transmitted by a sensor system, e.g., data representing a FOV of a lidar range-data collection (detection) system, as an effective method of guaranteeing or indicating that data is being updated correctly and is not artificially stagnant. Example embodiments of the present disclosure may be used for or with lidar systems and components that may be used for, e.g., specification of an Application Safety Integration Level (ASIL) in compliance with a safety standard such as ISO 26262 or the like. The watchdog code(s) can be effectively tied to the path(s) and system(s) the data traverse before arriving at a system and/or application that utilizes the data, e.g., a point cloud generation system or related software application. Use of watchdog codes for indicating that data is being updated correctly is not limited to lidar systems, however, and watchdog codes according to the present disclosure may be implemented for other types of sensor systems, as described below for FIG. 2.

Figure 2:
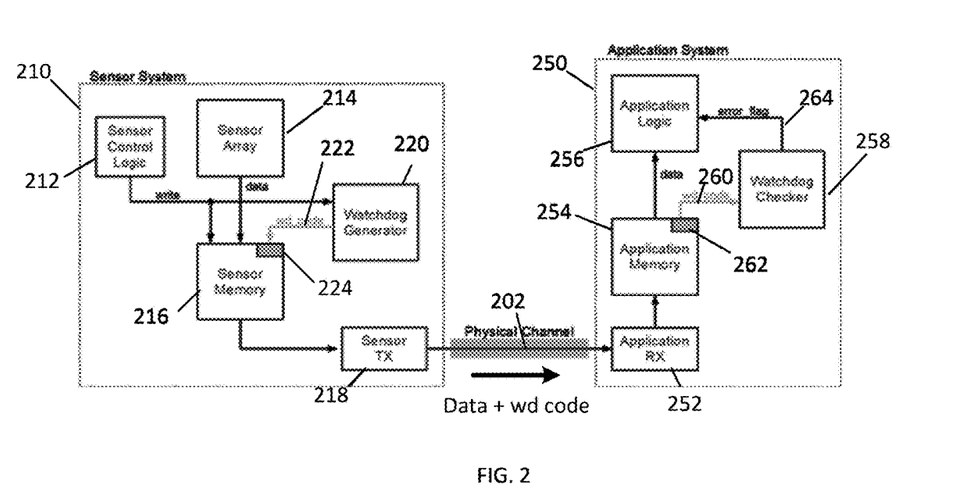
FIG. 2 is a block diagram of a system/circuit for watchdog code generation, transmission, and checking for sensor systems, in accordance with example embodiments of the present disclosure.

FIG. 2 is a block diagram of a system/circuit 200 for watchdog code generation, transmission, and checking for sensor systems and components, in accordance with example embodiments of the present disclosure. System/circuit 200 can function to verify a temporal state of data generated by and stored from a sensor system having one or more sensors. The system/circuit 200 includes a sensor system 210 and an application system 250. The sensor system includes a sensor control logic block 212, one or multiple sensors 214, and memory element 216 (indicated as sensor memory). The one or more sensors 214 may generally be any type of sensor. The term "sensor" may generally be used interchangeably with "detector" or "transducer." In some embodiments, the sensor system 210 can include an array of sensors 214, as indicated. For example, in some embodiments, sensor array 214 can include acoustic sensors, magnetic field sensors, and/or other types of sensors. In example embodiments, sensor array 214 can include photo-detectors (e.g., arrayed photo-diodes). In some example embodiments, system/circuit 200 can include or be part of a lidar range-data collection system.

The sensor system 210 collects output signals from the sensor or sensors 214 and converts the output signal data into corresponding digital output values which are provided to the memory 216. The memory 216 collects the sensor data on some repeating cycle and makes it available to a data transmission system, indicated as sensor transmitter (Tx) 218. The repeating cycle may be arbitrarily assigned or set, e.g., by the system or an operator of the system. In one embodiment, the memory 216 can include a frame buffer where an entire two-dimensional array of data (data from a two-dimensional array of sensors) is stored in the memory 216 and then passed to the data transmission system. In another embodiment, the memory 216 can be a line buffer where a single-dimensional sensor output array data is stored in the memory 216 and then passed to the data transmission system 218. The data transmission system 218 reads data from the memory 216, e.g., using a data multi-plexing scheme to read the entire memory 216. The data transmission system 218 then transmits the data over a physical data transmission medium—indicated by physical channel 202—to a system receiving the sensor data, e.g., for use in a sensing application. In example embodiments, this cycle repeats after each sensor memory loading cycle.

Sensor system 210 includes a watchdog code generator 220 that generates a watchdog code 222 (indicated as "wd code"). The watchdog code 222 can be written into the memory 216 for the purpose of validating that the memory—including the data stored in it—has been updated as of a particular time (e.g., after the previous memory data transmission cycle or most recent write event, etc.), and is accordingly not stagnant. The watchdog code 222 is included or embedded in (or appended to) data in the memory system 216. The data, with included watchdog code 222, from the memory 216 is then transmitted by the data transmission system 218 over the physical channel 202 for use by the application system 250, e.g., an autonomous vehicle control system. Any suitable code may be used for the watchdog code(s). In example embodiments, the watchdog code can be a periodically repeating code of a given or specified length (e.g., 4 bits, 8 bits, 12 bits, etc.), which repeats on a code cycle.

The physical channel 202 includes a physical medium or collection of physical media, connecting the sensor system 210 and the application system 250, over which the sensor data and the watchdog code are sent. In one embodiment, the physical channel 202 can include a high-speed serial channel where each bit is sent sequentially though a single transmission medium. In another embodiment, the physical channel 202 can include a parallel data channel where groups of sensor data bits are sent in parallel over a parallel data channel. In another embodiment, multiple serial channels can be used to, e.g., send fixed groups of sensor data and watchdog data over multiple serial links. In some applications, the physical channel may include a wireless (RF) and/or an optical (e.g., fiber) link.

The application system 250 includes a data receiver system, indicated as receiver (Rx) 252, which receives the data with watchdog code(s) from the physical channel 202. In example embodiments, the receiver system 252 reconstructs the sensor data into words representing the sensor values from the sensor(s) 214. The data receiver system 252 passes the received data into a receiver memory 254, e.g., a buffer, for further use by an application logic block 256, e.g., for point cloud generation, etc. The receiver system 252 also receives the watchdog code data and stores it in the receiver memory 254. The receiver memory 254 holds data after being transmitted from the sensor system 210 to the receiver system 250. Included in the memory 254 is sensor data and watchdog data representing or including the watchdog code. The sensor data is retrieved by the application system 250 while the watchdog data is reviewed by a watchdog checker circuit 258.

The watchdog checker circuit (watchdog checker) 258 reviews watchdog codes over periodic data transmission cycles and confirms whether the watchdog code is changing as expected with each grouping of data. Under non-error conditions, the watchdog checker 258 will normally determine that a watchdog code 260 retrieved from receiver memory 254 matches a watchdog code 222 that was generated by the watchdog generator 220 in the sensor system 210 for that set of sensor data (prior to transmission over the physical channel 202).

In one embodiment the check of the watchdog code can occur or be performed for every frame of stored sensor data, e.g., a set of data from a 2D sensor array. In another embodiment, the check can occur or be performed for every line of stored sensor data, e.g., a set of data representing outputs from a 1D sensor array, concatenated sensor values from multiple sensors, or multiple sensor values from one or more sensors at different times. In another embodiment, the check occurs after data from a group of sensors, e.g., representing pixels in a FOV, has been transmitted and stored. The watchdog checker 258 may evaluate a single watchdog code per repeating cycle, or it may review several codes per repeating cycle, confirming that all sensor data associated with each watchdog code is new data and not stale data (or, conversely, determining that sensor data is stagnant). In the event that the watchdog checker 258 determines that watchdog code is not correct, e.g., that the watchdog code under evaluation is linked to an older or stale set of data, an error indication can be generated, as shown by error flag 264.

In one embodiment, the watchdog code 222 can be updated when a memory write event, signaling a write from the sensor system to the memory element, occurs or is detected. When a qualifying write event occurs, the updated (new) watchdog code 222 is also written to the memory (e.g., as shown at memory location 224), indicating that the memory 216 has been updated with new data, e.g., representing sensor values from a later time. In another embodiment, the watchdog code 222 can be updated every repeating memory write cycle and written to the sensor memory (or memories) 216 only when a write signal is delivered to the memory element(s).

In example embodiments, the watchdog code 222 may be or include any changing code. In some embodiments, a counter can be used as the watchdog code generator where the watchdog code increments or decrements with each sensor system memory write cycle. In another embodiment, a single-bit, alternating code can be used as the watchdog code, where the watchdog code bit simply alternates between a logical 0 and a logical 1 with each sensor system memory write cycle. Of course, other suitable watchdog codes may be used within the scope of the present disclosure.

In some embodiments, the memory system can include a memory architecture with a series of memory elements, and a watchdog code may be injected into the earliest memory element in the series structure. The watchdog code then will travel though the series of memory elements eventually reaching the data transmission system. In this way, if any memory element fails to correctly update its data, the watchdog code will not be updated and the stale data will be detectable by a check of the watchdog code included with the data.

Figure 3:
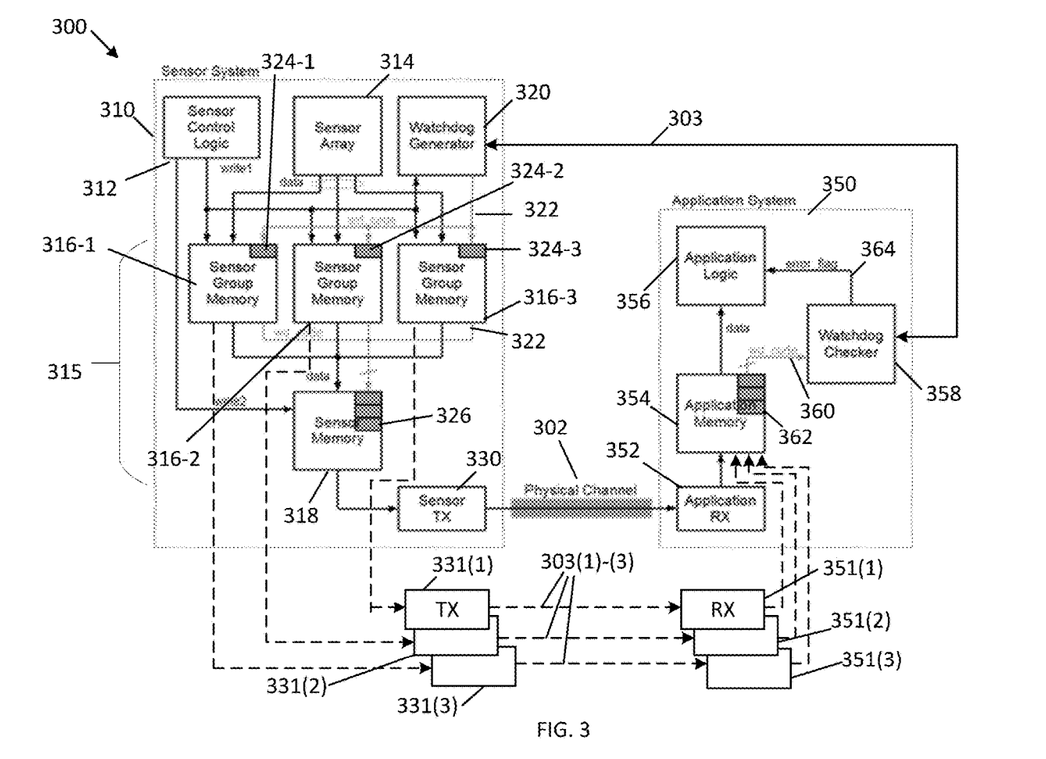
FIG. 3 is a block diagram of a system/circuit for watchdog code generation, transmission, and checking utilizing multiple parallel and serial memory elements and multiple watchdog codes, in accordance with example embodiments of the present disclosure.

FIG. 3 is a block diagram of system/circuit 300 for watchdog code generation, transmission, and checking utilizing multiple parallel and serial memory elements and multiple watchdog codes, in accordance with example embodiments of the present disclosure. System/circuit 300 includes a sensor system 310 and an application system 350 connected by a physical channel 302. The sensor system includes a sensor control logic block 312, a sensor array 314, a memory architecture or structure 315 with multiple (N) memory elements 316(1)-(3), 318, a watchdog generator 320, and a data transmission system 330. Of course, while three memory elements 316 are indicated, the number (N) of memory elements may be selected as desired for any given application.

As shown, the memory structure 315 can include multiple memory elements configured in parallel 316(1)-(3) and in series 318. The multiple parallel memory elements 316(1)-(3) can each manage a subset of the sensor data output from the sensor array 314. The watchdog generator 320 generates a watchdog code 322 that can be stored at respective location 324(1)-(3) in the parallel memory elements 316(1)-(3). In example embodiments, the watchdog codes 322 are embedded as data bits associated with the data stored in each of the first-stage parallel memory elements 316(1)-(3). The data stored in the parallel memory elements 316(1)-(3), e.g., sensor values with included watchdog codes, are then passed, e.g., in sequence, to one or more additional memory elements in series with the parallel memory elements 316(1)-(3), indicated by memory element 318. The watchdog code data may be stored in memory element 318 as an accumulated or "stacked" set of watchdog codes 322, as indicate by memory location 326. The data and watchdog codes from memory element 318 can be delivered to the data transmission system 330 for transmission over the physical channel 302 to the application system 350.

In an alternate embodiment, the multiple parallel memory elements 316(1)-(3) can send their respective sets of data, with included watchdog codes, to separate respective data transmitters 331(1)-(3) that are configured to send the data over separate physical channels 303(1)-(3), as indicated by dashed lines, to the application system 350.

The application system 350 includes a data receiver system (receiver), indicated as receiver (Rx) 352, which receives the data with included watchdog code(s) from the physical channel 302. In example embodiments, the receiver system 352 reconstructs the sensor data into digital words representing the sensor value data from the sensor(s) 314. The data receiver system 352 passes the received data into a receiver memory 354, e.g., a buffer, for further use by an application logic block 356, e.g., for point cloud generation, etc. The receiver system 352 also receives the watchdog code data 322 from the physical channel 302 and stores the data, e.g., each transmission cycle, as stored watchdog code data 360 in the receiver memory 354, as shown by memory location 362. The sensor data in the receiver memory 354 is retrieved by or provided to the application logic block 356 while the watchdog data 360 is reviewed by the watchdog checker circuit 358.

The watchdog code checker 358 knows or is provided with what the watchdog code should be for correct operation (functioning) of the sensor system 310 and/or data transmission system 330. For example, the watchdog checker 358 can know what the watchdog code should be based on previous watchdog codes and a known watchdog code generation algorithm, e.g., an incrementing or decrementing code value. As a further example, the watchdog code(s) 322 and/or an appropriate update algorithm (e.g., for updating an initial or subsequent watchdog code) can be transmitted directly or indirectly from the watchdog generator 320 to the watchdog code checker 358, e.g., for the purposes of watchdog code alignment or code comparison though different transmission paths (shown as channels or links 302 and 303). If the watchdog code alignment or code comparison indicate an error, the system 300 can respond, e.g., by generating a fault indication or warning. In some embodiments, the watchdog code(s) can be provided from a watchdog code generator, e.g., watchdog code generator 320, to a watchdog checker, e.g., watchdog checker 358, over a physical channel, e.g., a communication or second physical channel 303, that is different than the physical channel used for the sensor data, e.g., (first) physical channel 302. In example embodiments, such a physical channel, e.g., channel 303, can include a bidirectional register interface. In some embodiments, the starting watchdog code and possibly an update algorithm can be transmitted or provided to the watchdog checker, e.g., watchdog checker 358, e.g., as part of a setup procedure. The watchdog checker circuit 358 reviews watchdog codes 360 over periodic data transmission cycles and confirms whether the watchdog code 360 is changing, or has changed, as expected (i.e., correctly) with each grouping of data. For correct operation, watchdog code data 360 should correspond to the watchdog code 322 prior to transmission over the physical channel 302.

In the event a watchdog code in the receiver memory 354 is incorrect, e.g., does not apply to a given transmission cycle, the watchdog checker 358 can issue a warning indication, as shown by error flag 364, to alert, e.g., the application logic block 356 of an error condition. The application logic block 356 can take a responsive action such, e.g., ignoring the data associated with the watchdog code determined to be faulty, requesting retransmission of data from the sensor system 310, producing a warning indication or other alerts, etc.

Figure 4:
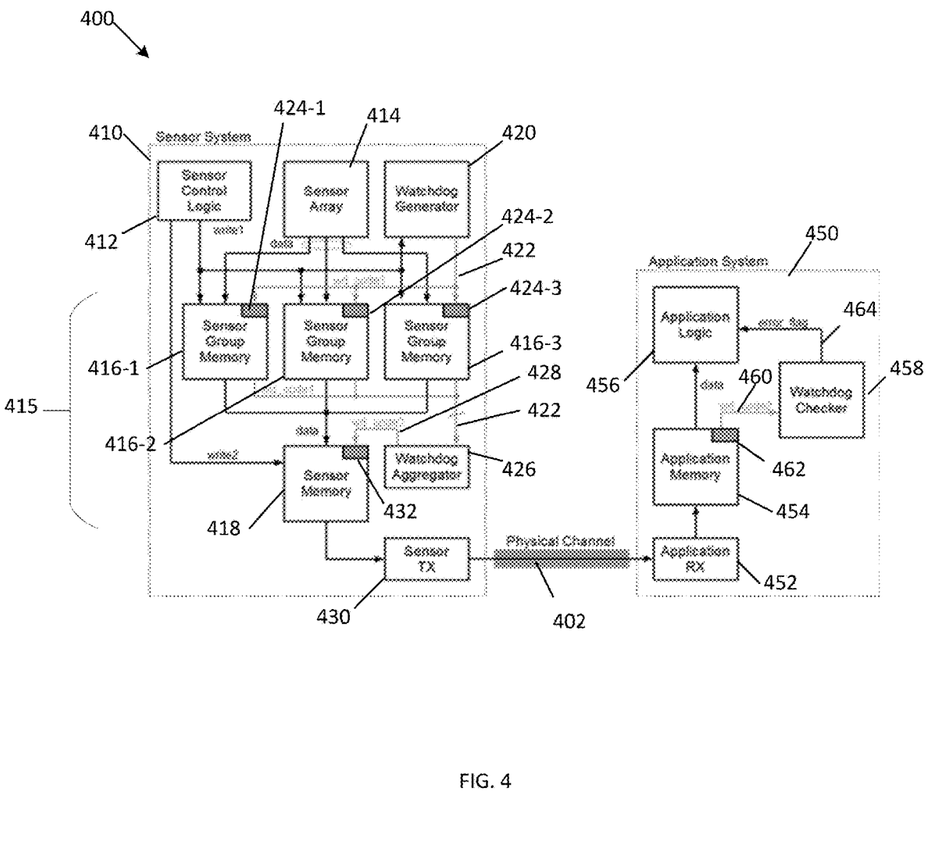
FIG. 4 is a block diagram of a system/circuit including a watchdog code aggregator for watchdog code generation, transmission, and checking utilizing multiple parallel and serial memory elements, in accordance with example embodiments of the present disclosure.

FIG. 4 is a block diagram of a system/circuit 400 for including a watchdog code aggregator for watchdog code generation, transmission, and checking utilizing multiple parallel and serial memories, in accordance with example embodiments of the present disclosure. System/circuit 400 is generally similar to system/circuit 300 but also includes a watchdog code aggregator 426, operation of which is described in further detail below.

System/circuit 400 includes a sensor control logic block 412, a sensor array 414, a memory structure 415, a watchdog code generator 420, and a data transmission system 430. The memory structure 415 can include a number of parallel memory elements 416(1)-(N), with three elements 416(1)-(3) being indicated by way of example, that are configured in series with one or more additional memory elements 418, with one being shown. The parallel memory elements 416(1)-(3) can be connected to individual sensor outputs or groups of sensor outputs of sensor array 414, e.g., one or more rows or columns of a 2D lidar detector array. Watchdog code generator 420 operates to generate first watchdog codes 422 (indicated as "wd code 1") for inclusion in the sensor data stored in the parallel memory elements 416(1)-(3), as shown by respective memory locations 424(1)-(3). The set of first watchdog codes 422 can be combined, e.g., logically combined, concatenated, or added together, by the watchdog code aggregator 426 to form a second or aggregated (aggregate) watchdog code 428 to indicate whether any of the stored data is stagnant. The combined or aggregate watchdog code 428 (indicated as "wd code 2") can be embedded in or added to the data in a serial memory element 418, as shown by memory location 432, prior to transmission over the physical channel 402 by the data transmission system 430.

The application system 450 includes a data receiver system (receiver), indicated as receiver (Rx) 452, a memory element 454, an application logic block 456, and a watchdog checker 458. The data receiver system receiver 452, receives the data with the aggregate watchdog code 428 from the physical channel 402. In example embodiments, the receiver system 452 reconstructs the sensor data into digital words representing the sensor values from the sensor(s) 414. The data receiver system 452 passes the received data into a receiver memory 454, e.g., a buffer, for further use by an application logic block 456, e.g., for point cloud generation, etc. The receiver system 452 also receives the watchdog code data 428 from the physical channel 402 and stores it, e.g., each transmission cycle, as stored watchdog code data 460 in the receiver memory 454, as shown by memory location 462. The receiver memory 454 holds data after being transmitted from the sensor system 410 to the receiver system 450. The sensor data in the receiver memory 454 is retrieved by or provided to the application logic block 456 while the watchdog data 460 is reviewed by the watchdog checker circuit 458. The watchdog checker circuit 458, which knows (is programmed with) what the watchdog code should be for correct operation (functioning) of the sensor system 410 and/or data transmission system 430, reviews watchdog code data 460 over periodic data transmission cycles and confirms whether the watchdog code 460 is changing, or has changed, as expected (i.e., correctly) with each grouping of data. For correct operation, watchdog code data 460 should correspond to the aggregate watchdog code 428 prior to transmission over the physical channel 402.

In example embodiments, the aggregate watchdog code 428 may be a single status bit. In other embodiments, the aggregate watchdog code 428 can be or include or a single aggregate watchdog code formed from a logical combination or addition (e.g., binary, hexadecimal, decimal, or other code) of the first watchdog codes 422 used for the parallel memory elements 416(1)-(3). Other suitable aggregate watchdog codes 428 may of course be used within the scope of the present disclosure.

Figure 5:
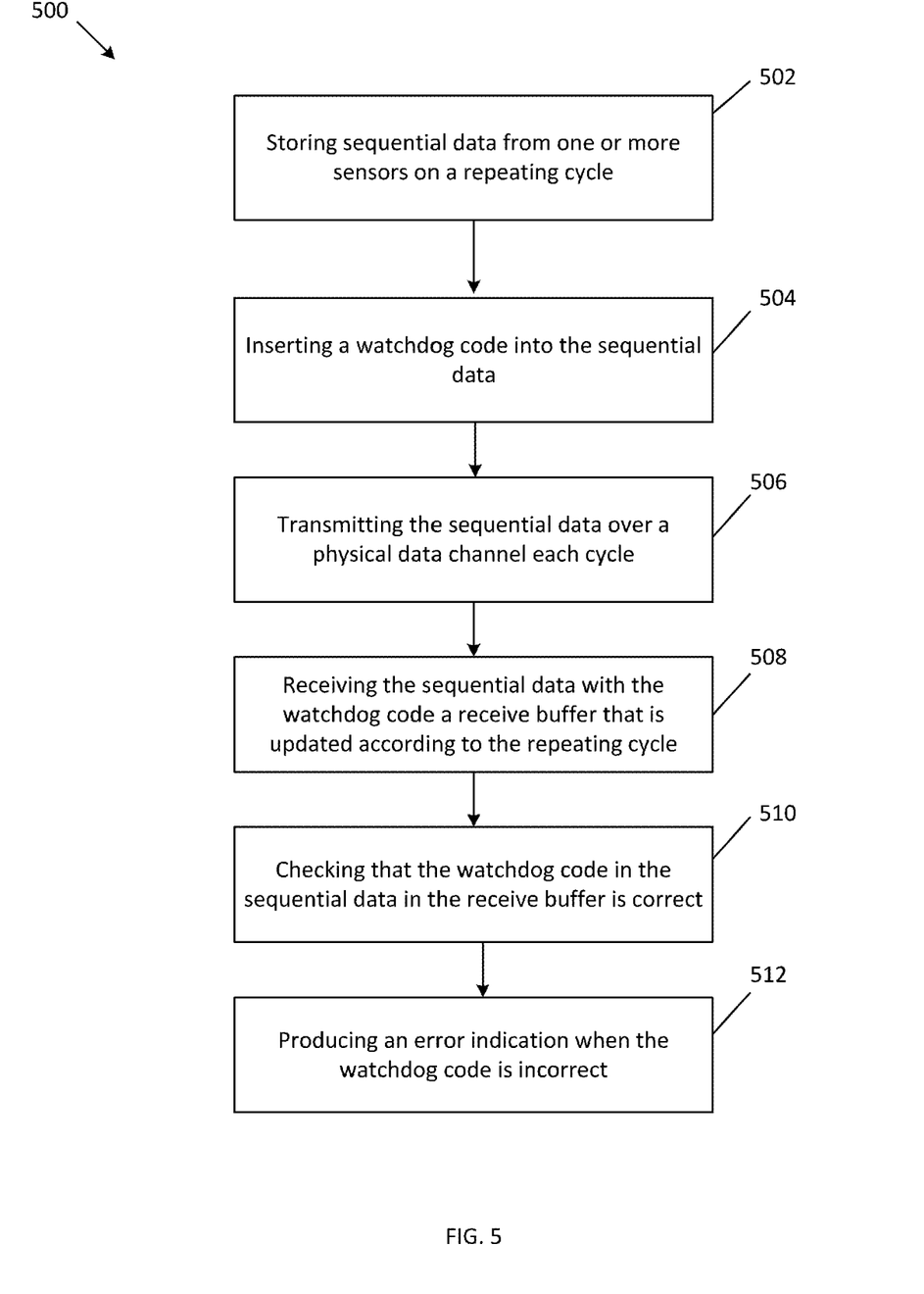
FIG. 5 is a block diagram of a method of watchdog code generation, transmission, and checking for sensor systems, in accordance with example embodiments of the present disclosure.

FIG. 5 is a block diagram of a method 500 of watchdog code generation, transmission, and checking for sensor systems, in accordance with example embodiments of the present disclosure. Sequential data from one or more sensors can be stored on a repeating cycle, as described at 502. A watchdog code can be inserted into the sequential data, as described at 504. The sequential data, including the watchdog code, can be transmitted over a physical data channel, e.g., each cycle, as described at 506. The sequential data with the watchdog code can be received at a memory element, e.g., receive buffer, that is updated according to the repeating cycle, as described at 508. The watchdog code in the sequential data in the receive buffer can be checked for correctness, as described at 510. An error indication can be produced when the watchdog code is incorrect, as described at 512.

Figure 6:
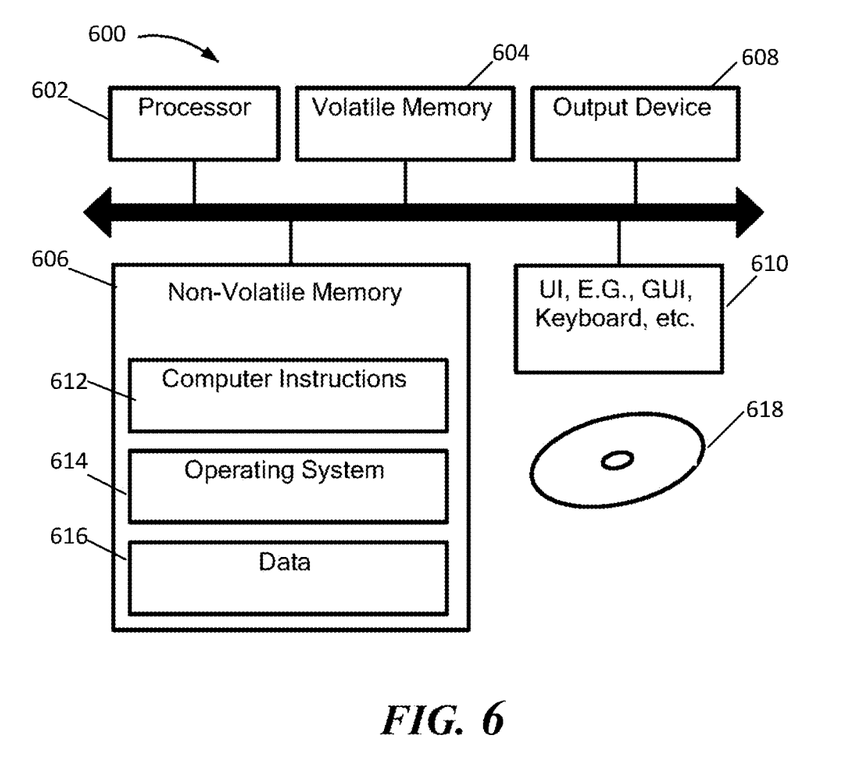
FIG. 6 is a block diagram of an example computer system operative to perform processing, in accordance with the present disclosure.

FIG. 6 is a block diagram of an example computer system 600 operative to perform processing, in accordance with the present disclosure. Computer system 600 can perform all or at least a portion of the processing, e.g., steps in the algorithms and methods, described herein. The computer system 600 includes a processor 602, a volatile memory 604, a non-volatile memory 606 (e.g., hard disk), an output device 608 and a user input or interface (UI) 610, e.g., graphical user interface (GUI), a mouse, a keyboard, a display, and/or any common user interface, etc. The non-volatile memory (non-transitory storage medium) 606 stores computer instructions 612 (a.k.a., machine-readable instructions, computer-readable instructions, or code) such as software (computer program product or software application), an operating system 614 and data 616. In one example, the computer instructions 612 are executed by the processor 602 out of (from) volatile memory 604. In one embodiment, an article 618 (e.g., a storage device or medium such as a hard disk, an optical disc, magnetic storage tape, optical storage tape, flash drive, etc.) includes or stores the non-transitory computer-readable instructions. Bus 620 is also shown.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), and optionally at least one input device, and one or more output devices. Program code may be applied to data entered using an input device or input connection (e.g., port or bus) to perform processing and to generate output information.

The system 600 can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. Further, the terms "computer" or "computer system" may include reference to plural like terms, unless expressly stated otherwise.

Processing may be performed by one or more programmable processors executing one or more computer programs to perform the functions of the system. All or part of the system may be implemented as, special purpose logic circuitry, e.g., an FPGA (field programmable gate array) and/or an ASIC (application-specific integrated circuit).

Accordingly, embodiments of the inventive subject matter can afford various benefits relative to prior art techniques. Embodiments of the present disclosure can provide for embedding a watchdog code or signal in transmission data from a sensor system to an application system as an effective method of indicating and/or guaranteeing that data from the sensors is being updated on a correct timing basis for use by the application system using the data and is not artificially stagnant. The watchdog data is tied to the data transmission path and systems the data traverses before making it to the system that uses the data, e.g., a point cloud generation system that utilizes lidar ranging data generated by a lidar detector array. Example embodiments of the present disclosure can enable or provide lidar systems and components achieving or obtaining an Application Safety Integration Level (ASIL) in accordance with a safety standard such as ISO 26262.

Various embodiments of the concepts, systems, devices, structures, and techniques sought to be protected are described above with reference to the related drawings. Alternative embodiments can be devised without departing from the scope of the concepts, systems, devices, structures, and techniques described. For example, while description of embodiments of the present disclosure has been in the context of sensors used with or for lidar systems, aspects of the present disclosure can include or be applied to other types of sensor systems, e.g., acoustic, seismic, pressure, acceleration, to name just a few.

It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, that includes a list of elements is not necessarily limited to only those elements but can include other elements not expressly listed or inherent to such apparatus, method, composition, mixture, or article.

Additionally, the term "exemplary" means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e., one, two, three, four, etc. The term "plurality" indicates any integer number greater than one. The term "connection" can include an indirect "connection" and a direct "connection".

References in the specification to "embodiments," "one embodiment," "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Relative or positional terms including, but not limited to, the terms "upper," "lower," "right," "left," "vertical," "horizontal," "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within plus or minus (±) 10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions as far as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

What is claimed is:

1. A data-stream watchdog system comprising:
   a sensor system configured to detect physical phenomena and produce corresponding output signals;
   a memory structure configured to store the output signals as sequential data on a repeating cycle;
   a watchdog code generator configured to insert a watchdog code into the stored sequential data and update the watchdog code periodically;
   a data transmission system configured to receive the sequential data with included watchdog code from the memory structure and transmit the sequential data with the included watchdog code over a physical data channel each cycle of the repeating cycle;
   a data receiver system configured to read the sequential data with included watchdog code from the physical data channel;
   a receive buffer configured to store the sequential data with the included watchdog code from the data receiver system each cycle of the repeating cycle; and
   a watchdog code checker configured to check whether the watchdog code in the sequential data from the receive buffer is correct and produce an error indication when the watchdog code is incorrect.

2. The system of claim 1, wherein the memory structure comprises a frame buffer.

3. The system of claim 1, wherein the memory structure comprises a line buffer.

4. The system of claim 1, wherein the memory structure comprises a plurality of memory units configured in parallel.

5. The system of claim 4, wherein each memory unit corresponds to a respective subset of the sensor system output signals.

6. The system of claim 4, wherein the memory structure further comprises one or more memory units configured in series with the plurality of memory units configured in parallel.

7. The system of claim 4, wherein the data transmission system is configured to multiplex the sequential data from the entire memory structure for each cycle of the memory structure.

8. The system of claim 7, further comprising a watchdog aggregator configured to aggregate the watchdog codes from the respective parallel memories and insert an aggregate watchdog code into the sequential data for transmission over the physical data channel.

9. The system of claim 1, wherein the watchdog code generator is configured to generate the watchdog code as a periodically repeating code cycle of specified length.

10. The system of claim 9, wherein the watchdog code generator is configured to implement a counter.

11. The system of claim 9, wherein the watchdog code generator is configured to implement an alternating bit generator.

12. The system of claim 1, wherein the physical data channel comprises a serial link.

13. The system of claim 1, wherein the physical data channel comprises a parallel link.

14. The system of claim 13, wherein the parallel link includes multiple serial links.

15. The system of claim 1, wherein the sensor system includes a single sensor.

16. The system of claim 1, wherein the sensor system includes a plurality of sensors.

17. The system of claim 16, wherein the plurality of sensors includes a plurality of optical detectors.

18. The system of claim 17, wherein the plurality of optical detectors comprises infrared detectors.

19. The system of claim 18, wherein the sensor system comprises a lidar range data collection system configured to detect successive lidar returns and produce respective output signals.

20. The system of claim 1, wherein the watchdog code generator is configured to update the watchdog code and insert the updated watchdog code into the sequential data each time the sequential data is written to the memory structure.

21. The system of claim 1, wherein the watchdog code generator is configured to update the watchdog code every cycle of the repeating cycle and insert the updated watchdog code into the sequential data when the sequential data is written to the memory structure.

22. The system of claim 1, wherein the wherein the watchdog code checker is further configured to receive the watchdog code from the watchdog code generator over a communication channel separate from the physical data channel and to compare the watchdog code received from the watchdog code generator to the watchdog code included with the sequential data.

23. The system of claim 1, wherein the wherein the watchdog code checker is further configured to receive the watchdog code and/or a watchdog code update algorithm from the watchdog code generator over a communication channel separate from the physical data channel.

24. A method of embedding a watchdog signal in a data stream from a sensor system having one or more sensors, the method comprising:
   storing signals from the sensor system in a memory structure as sequential data on a repeating cycle;
   inserting an updatable watchdog code into the sequential data;
   transmitting the sequential data with included watchdog code over a physical data channel each cycle of the repeating cycle;

receiving the sequential data with included watchdog code in a receive buffer that is updated each cycle of the repeating cycle;

checking whether the watchdog code in the received sequential data is correct; and generating an error indication when the watchdog code in the received sequential data is incorrect.

25. The method of claim 24, wherein storing signals from the sensor system comprises storing range data from a lidar range data collection system configured to detect successive lidar returns and produce respective output signals.

26. The method of claim 24, wherein the memory structure comprises a plurality of parallel memory units, the method further comprising multiplexing the sequential data from all of the memory units of the memory structure each cycle of the repeating cycle.

27. The method of claim 26, further comprising aggregating the watchdog codes from the respective parallel memories into an aggregate watchdog code, wherein inserting the watchdog code into the sequential data comprises inserting the aggregate watchdog code into the sequential data for transmission over the physical data channel.

28. The method of claim 24, wherein inserting the watchdog code includes inserting a periodically repeating code sequence of specified length.

29. The method of claim 28, wherein inserting the watchdog code includes implementing a counter.

30. The method of claim 28, wherein inserting the watchdog code includes implementing an alternating bit generator.

31. The method of claim 24, further comprising updating the watchdog code periodically.

32. The method of claim 31, wherein updating the watchdog code periodically comprises updating the watchdog code for each cycle of the repeating cycle.

33. The method of claim 31, further comprising detecting a memory write event each time the sequential data is written to the memory structure.

34. The method of claim 33, wherein the updated watchdog code is inserted into the sequential data in response to detecting the memory write event.

35. The method of claim 24, further comprising the watchdog code checker receiving the watchdog code from the watchdog code generator over a communication channel separate from the physical data channel and comparing the watchdog code received from the watchdog code generator to the watchdog code included with the sequential data.

36. The method of claim 24, further comprising the watchdog code checker receiving the watchdog code and/or a watchdog code update algorithm from the watchdog code generator over a communication channel separate from the physical data channel.

\* \* \* \* \*